(12) United States Patent
Trojer et al.

(10) Patent No.: US 9,780,989 B2
(45) Date of Patent: Oct. 3, 2017

(54) SPECTRUM SHAPING FOR OFDM/DMT

(71) Applicant: TELEFONAKTIEBOLAGET L M ERICSSON (PUBL), Stockholm (SE)

(72) Inventors: Elmar Trojer, Täby (SE); Miguel Berg, Upplands Väsby (SE); Per-Erik Eriksson, Stockholm (SE); Chenguang Lu, Sollentuna (SE); Thomas Magesacher, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 26 days.

(21) Appl. No.: 14/787,723

(22) PCT Filed: May 8, 2013

(86) PCT No.: PCT/EP2013/059625
§ 371 (c)(1),
(2) Date: Oct. 28, 2015

(87) PCT Pub. No.: WO2014/180503
PCT Pub. Date: Nov. 13, 2014

(65) Prior Publication Data
US 2016/0191293 A1    Jun. 30, 2016

(51) Int. Cl.
*H04L 27/34* (2006.01)
*H04L 5/00* (2006.01)
*H04L 27/36* (2006.01)
*H04L 25/03* (2006.01)
*H04L 27/26* (2006.01)

(52) U.S. Cl.
CPC .... *H04L 27/3411* (2013.01); *H04L 25/03828* (2013.01); *H04L 27/2602* (2013.01); *H04L 27/3405* (2013.01); *H04L 27/367* (2013.01); *H04L 5/0007* (2013.01); *H04L 27/2614* (2013.01); *H04L 27/2618* (2013.01); *H04L 27/366* (2013.01)

(58) Field of Classification Search
CPC .............. H04L 27/3411; H04L 27/367; H04L 25/03828; H04L 5/0007
See application file for complete search history.

(56) References Cited

U.S. PATENT DOCUMENTS 5,825,816 A * 10/1998 Cole .................... H04B 14/023
                                                                  375/222
6,434,190 B1 * 8/2002 Modlin ............... H04L 25/4906
                                                                  375/222

(Continued)

OTHER PUBLICATIONS

Van De Beek, et al., N-continuous OFDM, IEEE Communications Letters, vol. 13, No. 1, Jan. 2009, pp. 1-3.

(Continued)

*Primary Examiner* — Rasheed Gidado (57) ABSTRACT

There is provided spectrum shaping of a signal. A frequency-domain representation of the signal to be spectrum-shaped is provided. The signal is associated with a set of constellation points having a minimum distance. A spectrum-shaped signal is determined by altering a proper subset of the constellation points while maintaining the minimum distance between all of the constellation points. The spectrum-shaped signal is transformed into a time-domain signal.

19 Claims, 5 Drawing Sheets

(56) References Cited

U.S. PATENT DOCUMENTS

| | | | | |
|---|---|---|---|---|
| 7,869,490 B1* | 1/2011 | Wilson | ............. | H04L 25/03834 375/211 |
| 8,300,729 B2* | 10/2012 | Wang | ................... | H04L 27/362 375/296 |
| 2003/0123564 A1* | 7/2003 | Ophir | ............... | H04L 25/03828 375/265 |
| 2004/0151109 A1* | 8/2004 | Batra | ................... | H04B 1/7163 370/208 |
| 2012/0224657 A1* | 9/2012 | Sasaki | ................ | H04L 27/2273 375/326 |
| 2013/0201814 A1* | 8/2013 | Lo | ...................... | H04L 27/2624 370/210 |

OTHER PUBLICATIONS

Krongold, et al., PAR Reduction in OFDM via Active Constellation Extension, IEEE Transactions on Broadcasting, vol. 49, No. 3, Sep. 2003, pp. 258-268.

Zogakis, et al., Application of Shaping to Discrete Multitone Modulation, Proceedings of the Global Telecommunications Conference (Globecom), Nov. 28-Dec. 2, 1994, pp. 1894-1898.

Brandes, et al., Reduction of Out-of-Band Radiation in OFDM Based Overlay Systems, 2005 1st IEEE International Symposium on New Frontiers in Dynamic Spectrum Access Networks, Nov. 8, 2005, pp. 662-665.

Campanella, et al., A Design Technique for Spectral Shaping in CPM Systems, IEEE Transactions on Communications, vol. 45, No. 5, May 1997, pp. 502-507.

* cited by examiner

SPECTRUM SHAPING FOR OFDM/DMT

This application is a 371 of International Application No. PCT/EP2013/059625, filed May 8, 2013, the disclosure of which is fully incorporated herein by reference.

TECHNICAL FIELD

Embodiments presented herein relate to spectrum shaping a signal, and particularly to a method, communications device, and computer program suitable for spectrum shaping a signal.

BACKGROUND

In communication systems, there is always a challenge to obtain good performance and capacity for a given communications protocol, its parameters and the physical environment in which the communication system is deployed.

Orthogonal Frequency Division Multiplexing (OFDM) modulation and Discrete Multi-Tone (DMT) modulation are state-of-the-art physical-layer modulation techniques used in a number of wireless and wireline communication systems.

Examples include, but are not limited to, the long term evolution (LTE) 4:th generation (4G) mobile communication standard and the high-speed access-technology standards A/VDSL (Very-high-bit-rate digital subscriber line) and G.fast. OFDM/DMT has a number of advantages. Some of these advantages include, but are not limited to, high spectral efficiency, low-complexity implementation of modulator and demodulator, low-complexity mitigation of large delay spreads (or equivalently, large frequency selectivity), and high flexibility. The most notable drawbacks are high peak-to-average-power ratio (PAPR) of the transmit signal and high in-band spectral leakage.

Flexibility in control over the transmit spectrum and good in-band as well as out-of-band suppression are advantageous for many communication systems. When attempting to feed wireless signals over band-limited, guided channels (such as coaxial cables, copper cables of various grades, power lines, etc.), spectrum control and out-of-band suppression are of importance. Good spectral suppression enables tight packing of multiple transmission signals (corresponding, for example, to different antenna streams or transmit directions) into the band offered by a guided channel.

A first group of existing spectral suppression methods typically enable a modest spectrum-shaping capability not yielding the desired out-of-band suppression. A second group of existing spectral suppression methods provides a higher spectrum-shaping capability than methods of the first group, but introduces pre-distortion in the constellation domain (i.e., by moving points off the constellation grid) such that system performance is affected.

Hence, there is still a need for an improved spectrum shaping.

SUMMARY

An object of embodiments herein is to provide improved spectrum shaping.

The enclosed embodiments are based on the understanding that existing spectral suppression methods either keep signal distortion at an acceptable level but only yield modest suppression performance, or achieve good suppression performance but introduce high signal distortion.

A particular object is therefore to provide distortion-free spectrum shaping with good spectrum suppression capabilities.

According to a first aspect there is presented a method of spectrum shaping a signal. The method comprises providing a frequency-domain representation of the signal to be spectrum-shaped. The signal is associated with a set of constellation points having a minimum distance. The method comprises determining a spectrum-shaped signal by altering a proper subset of the constellation points whilst maintaining the minimum distance between all of the constellation points. The method comprises transforming the spectrum-shaped signal into a time-domain signal.

The minimum distance may be regarded as a mutual minimum distance since the distance between any two constellation points is at least equal to the minimum distance.

Advantageously this provides distortion-free spectrum shaping with good spectrum suppression capabilities. For example, the disclosed spectrum shaping will preserve minimum distance of quadrature amplitude modulation without introducing any signal distortion or bit-error-rate penalty.

According to a second aspect there is presented a communications device for spectrum shaping a signal. The communications device comprises a communications interface arranged to provide a frequency-domain representation of the signal to be spectrum-shaped. The signal is associated with a set of constellation points having a minimum distance. The communications device comprises a processing unit arranged to determine a spectrum-shaped signal by altering a proper subset of the constellation points whilst maintaining the minimum distance between all of the constellation points. The processing unit is further arranged to transform the spectrum-shaped signal into a time-domain signal.

According to a third aspect there is presented a computer program for spectrum shaping a signal, the computer program comprising computer program code which, when run on a communications device, causes the communications device to perform a method according to the first aspect.

According to a fourth aspect there is presented a computer program product comprising a computer program according to the third aspect and a computer readable means on which the computer program is stored. According to an embodiment the computer readable means are non-volatile computer readable means.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The present disclosure is now described, by way of example, with reference to the accompanying drawings, in which.

DETAILED DESCRIPTION

The inventive concepts will now be described more fully hereinafter with reference to the accompanying drawings, in which certain embodiments are shown. The inventive concepts may, however, be embodied in many different forms and should not be construed as limited to the embodiments set forth herein; rather, these embodiments are provided by way of example so that this disclosure will be thorough and complete, and will fully convey the scope of the inventive concepts to those skilled in the art. Like numbers refer to like elements throughout the description. In the flowcharts, any step illustrated in a box with dashed lines should be regarded as optional.

As noted above, Orthogonal Frequency Division Multiplexing (OFDM) modulation and Discrete Multi-Tone (DMT) modulation are state-of-the-art physical-layer modulation techniques used in a number of wireless and wireline communication systems.

In general terms, out-of-band radiation or spectral leakage into adjacent frequency bands is an issue every communication system has to deal with due to legacy requirements or to assure proper system interoperability. When all subcarriers of an OFDM/DMT system are used (i.e., modulated with data), the out-of band spectrum is sculptured exclusively by the analog post-filters following the digital-to-analog converter. When only a subband is used (hereinafter, referred to as in-band transmission), however, the spectrum in the remainder of the band can be shaped efficiently (i.e., avoiding digital or analog adjustable filters) only through modifying the data modulated on tones in the subband, referred hereinafter as in-band spectrum shaping. Modifying the data modulated on tones is also known as pre-coding.

Figure 8:
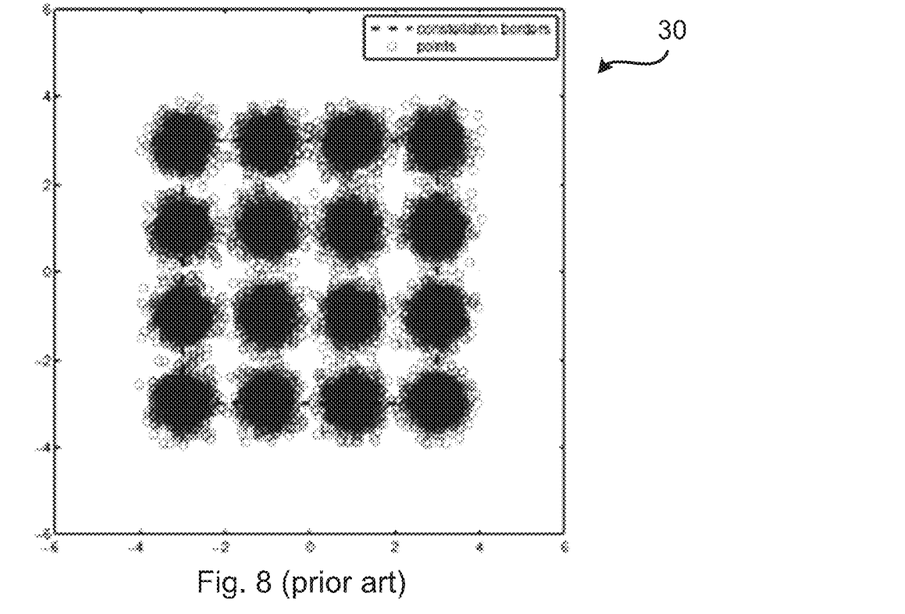
FIG. 8 illustrates constellation points in a signal constellation grid according to prior art.

FIG. 8 illustrates simulation results of different realizations over time of applying traditional pre-coding to a signal taking values in a set of constellation points in a signal constellation grid 30 in order to perform spectrum shaping. The signal constellation grid 30 comprises constellation points according to a 16-QAM (Quadrature Amplitude Modulation) signal constellation. In contrast to an original 16-QAM signal constellation the constellation points in the signal constellation grid 30 have, due to the pre-coding, been smeared out, causing the average minimum distance between the constellation points to decrease; as illustrated in FIG. 8 boarders between the constellation points are not visible. This will negatively affect the error rate performance of any communications system utilizing the signal constellation.

The embodiments disclosed herein relate to spectrum shaping a signal. In order to obtain spectrum shaping a signal there is provided a communications device, methods performed by the communications device, a computer program comprising code, for example in the form of a computer program product, that when run on a communications device, causes the communications device to perform the method.

Figure 1:
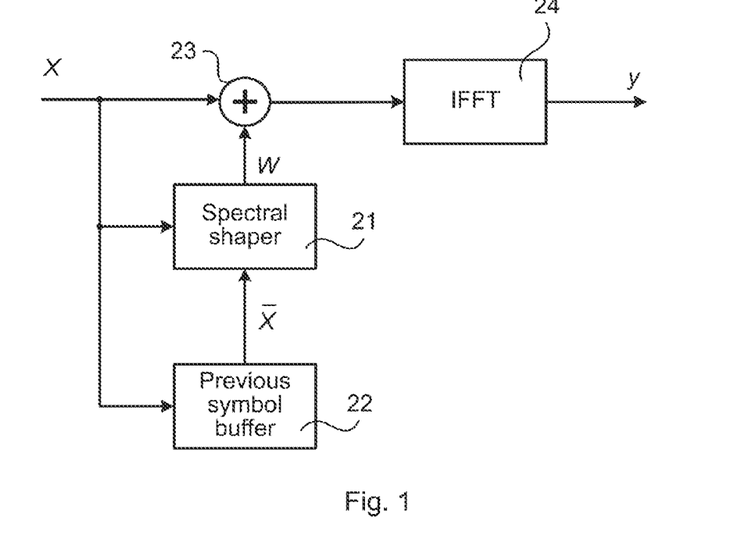
FIG. 1 is a schematic block diagram for spectrum shaping of a signal according to embodiments.

FIG. 1 illustrates a block diagram for spectrum shaping of a time-domain signal x according to embodiments that will be further disclosed below. A frequency-domain representation X of the signal x to be spectrum shaped is provided to a buffer functional unit 22 arranged to store at least one previous value of X. A current symbol of X and the value of at least one previous symbol of X, hereinafter denoted $\bar{X}$, are provided to a spectral shaper 21. The spectral shaper 21, as will be further disclosed below, is arranged to determine a correction signal, in the frequency-domain denoted W, to be added by an adder 23 to the current symbol of X. The thus formed combination X+W is then provided to an inverse fast Fourier transformer functional unit 24 in order to obtain a time-domain representation y of the thus spectrum-shaped signal.

Figure 2:
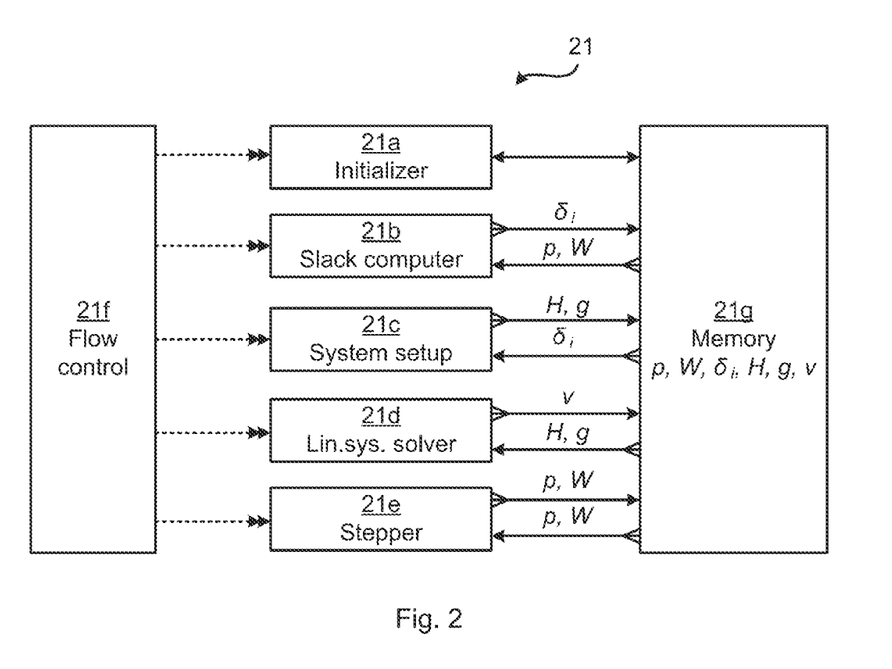
FIG. 2 is a schematic diagram showing functional modules of a spectrum shaper.

FIG. 2 schematically illustrates, in terms of a number of functional modules, the components of the spectral shaper 21 according to one embodiment. According to the embodiment illustrated in FIG. 2 the spectral shaper 21 comprises an initializer functional module 21a configured to initialize variables and parameters used by other functional modules of the spectral shaper. The spectral shaper further comprises a slack computer functional module 21b configured to computer values of slack variables. The spectral shaper further comprises a system setup functional module 21c configured to update system variables. The spectral shaper further comprises a linear system solver functional module 21d configured to solve linear systems of equations. The spectral shaper further comprises a stepper functional module configured 21e to update variables by stepping in a gradient indicated direction.

The operations of the aforementioned functional modules of the spectral shaper are supervised by a flow controller 21f, which may be implemented as a state machine. The spectral shaper 21 further comprises a memory functional module gig configured to store values of parameters and variables as accessed by the aforementioned functional modules 21a-f of the spectral shaper 21. A detailed description of the spectral shaper 21 will follow below. The functional modules 21a-f of the spectral shaper 21 as illustrated in FIG. 2 may be implemented in software, hardware, or any combination thereof, and the related functionality may be implemented by the processing unit 3, the memory 4, and the communications interface 5 of the communications device 1 illustrated in FIG. 3.

Figure 3:
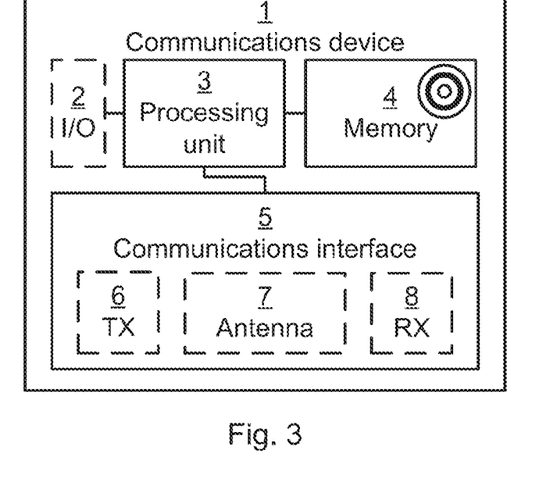
FIG. 3 is a schematic diagram showing functional modules of a communications device.

FIG. 3 schematically illustrates, in terms of a number of functional modules, the components of a communications device 1. A processing unit 3 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 9 (as in FIG. 4), e.g. in the form of a memory 4. Thus the processing unit 3 is thereby arranged to execute methods as herein disclosed. The memory 4 may also comprise persistent storage, which, for example, can be any single one or combination of magnetic memory, optical memory, solid state memory or even remotely mounted memory. The communications device 1 further comprises a communications interface 5 for receiving and providing data messages to another communications device. The communications interface 5 comprises one or more transmitters TX 6 and receivers RX 8. The communications interface 5 may further comprise a suitable number of antenna elements 7. In wireline applications TX 6 and RX 8 may comprise a physical media-dependent cable interface. The processing unit 3 controls the general operation of the communications device 1, e.g. by sending data and control signals to the communications interface 5, receiving data and control signals from the communications interface 5, retrieving instructions from the memory 4 and providing data to the memory 4. Other components, as well as the related functionality, of the communications device 1 are omitted in order not to obscure the concepts presented herein.

Figure 4:
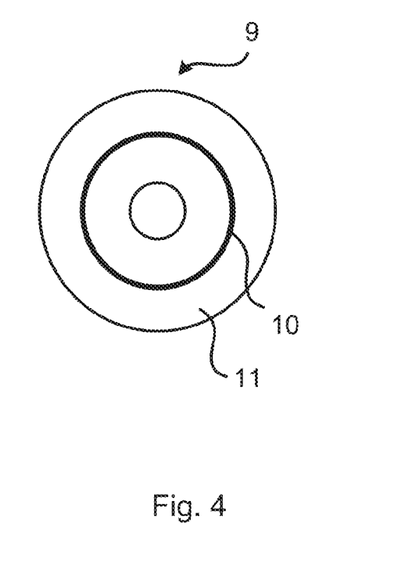
FIG. 4 shows one example of a computer program product comprising computer readable means.
Figure 5:
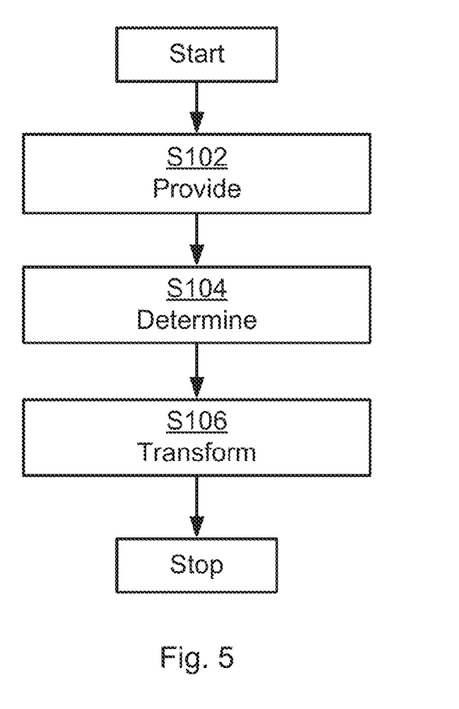
FIGS. 5, 6 and 7 are flowcharts of methods according to embodiments.
Figure 6:
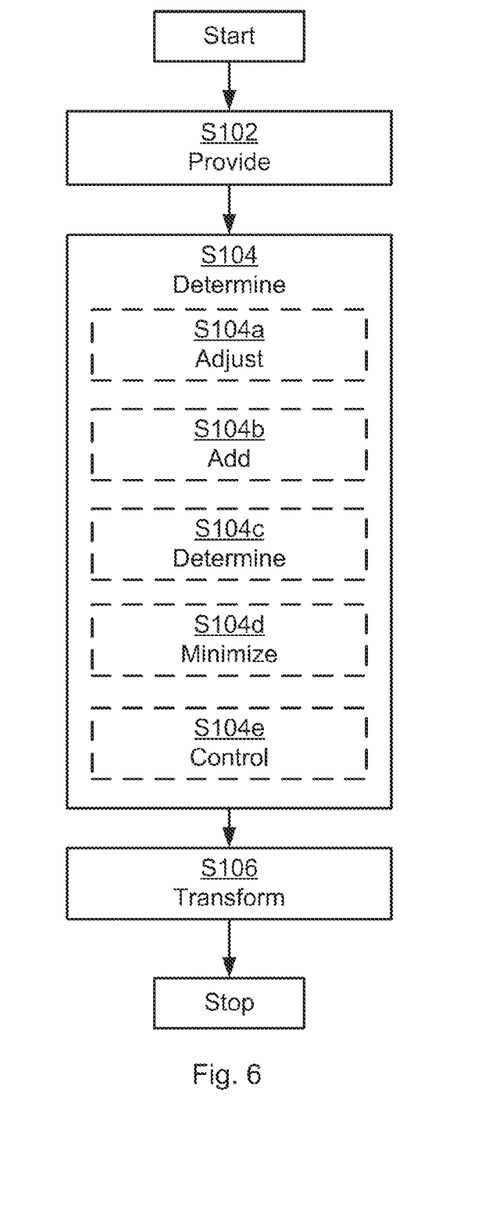
Figure 7:
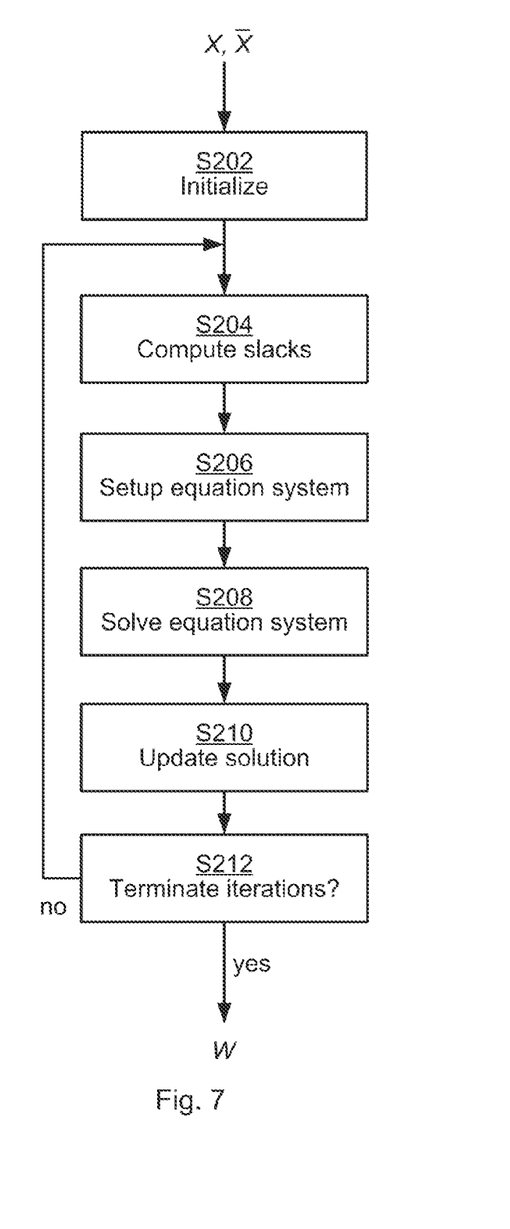

FIGS. 5, 6 and 7 provide flow charts illustrating embodiments of methods of spectrum shaping a signal. The methods are performed by the communications device 1, the functionality of which may be implemented by the spectral shaper 21. The methods are advantageously provided as computer programs 10. FIG. 4 shows one example of a computer program product 9 comprising computer readable means 11. On this computer readable means 11, a computer program 10 can be stored, which computer program 10 can cause the processing unit 3 and thereto operatively coupled entities and devices, such as the memory 4 and the communications interface 5 to execute methods according to embodiments described herein. The computer program 10 and/or computer program product 9 thus provides means for performing any steps as herein disclosed.

In the example of FIG. 4, the computer program product 9 is illustrated as an optical disc, such as a CD (compact disc) or a DVD (digital versatile disc) or a Blu-Ray disc. The computer program product 9 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 10 is here schematically shown as a track on the depicted optical disk, the computer program 10 can be stored in any way which is suitable for the computer program product 9.

In general terms and for notation purposes, consider an OFDM system with subcarrier spacing $\delta f$ Hz, T subcarriers out of which a contiguous set $T' \subset \{-T/2, -T/2+1, \ldots, T/2-1\}$ of T' subcarriers is used, and a cyclic prefix of length L samples (or equivalently, $L/(\delta fT)$ seconds). The T' subcarriers yield a used band of width $B'=T'f$. According to embodiments as will be disclosed below the spectral shaper 21 may improve the out-of-B'-band suppression by adding a correction signal $W \in \mathbb{C}^{T'}$ to the current OFDM symbol X. The point $X_i$, $i \in 1, 2, \ldots, T'$ on subcarrier number $T'_i$ is typically chosen from a regular lattice alphabet (for example, a quadrature amplitude modulation, QAM, signal constellation).

A method of spectrum shaping a signal comprises, in a step S102, providing a frequency-domain representation X of a signal x to be spectrum-shaped. The computer program 10 and/or computer program product 9 thus comprises means for providing a frequency-domain representation X of a signal x to be spectrum-shaped. The frequency-domain representation X of a signal x to be spectrum-shaped may be provided by the communications interface 5 of the communications device 1. According to one embodiment the signal to be spectrum-shaped represents orthogonal frequency-division multiplexing, OFDM, symbols. According to one embodiment the signal to be spectrum-shaped represents discrete multi-tone modulation, DMT, symbols.

The signal to be spectrum-shaped is associated with a set of constellation points. The set of constellation points is associated with a minimum distance between the constellation points. That is, the distance between any two constellation points is at least equal to the distance given by the minimum distance. According to one embodiment the constellation points represent signal points of Quadrature Amplitude Modulation, QAM. For example, the constellation points may represent 4-QAM, 16-QAM, 64-QAM, 256-QAM, or even higher modulation order QAM, etc.

The frequency-domain representation X of the signal x to be spectrum-shaped is acquired by the processing unit 3 of the communications device 1 for spectrum-shaping processing. That is, as herein disclosed the spectrum-shaping processing is performed in the frequency domain. However, it would also be possible to perform the alteration of the signal x in the time domain, e.g. convoluting the signal x to be spectrum-shaped with a time-domain representation w of a correction signal W. Particularly, the processing unit 3 is arranged to, in a step S104, determine a spectrum-shaped signal Y by altering a proper subset of the constellation points. The computer program 10 and/or computer program product 9 thus comprises means for determining a spectrum-shaped signal Y by altering a proper subset of the constellation points. A proper subset is also called a strict subset. The spectrum-shaped signal Y is determined such that the minimum distance between all of the constellation points is maintained. That is, also for all constellation points of the spectrum-shaped signal the distance between any two constellation points is at least equal to the distance given by the minimum distance required to achieve a wanted bit-error-rate performance.

Once spectrum-shaped the signal Y may be transformed into a time-domain signal y for actual transmission. Particularly, the processing unit 3 is arranged to, in a step S106, transform the spectrum-shaped signal Y into a time-domain signal y. The computer program 10 and/or computer program product 9 thus comprises means for transforming the spectrum-shaped signal Y into a time-domain signal y.

There may be different ways to alter the proper subset of the constellation points so as to obtain the spectrum-shaped signal Y. One example includes adjusting coordinates of constellation points in the proper subset. According to one embodiment the processing unit 3 is therefore arranged to, in an optional step S104a, adjust coordinates of constellation points in the proper subset. The computer program 10 and/or computer program product 9 may thus comprise means for adjusting coordinates of constellation points in the proper subset.

The proper subset may comprise different points in a constellation depending on how the spectrum-shaping is performed and what properties of the spectrum-shaped signal Y are required. According to one embodiment the proper subset of constellation points only comprises peripheral constellation points of the set of constellation points. Since the minimum distance between any two constellation points is to be maintained, the altering may thus involve moving peripheral constellation points of the set of constellation points "outwards" from the center of the original constellation points.

One way of realizing the alteration of the constellation points in the proper subset is by introducing a correction signal. The correction signal may be added to the signal to be spectrum-shaped in the frequency domain. Particularly, according to one embodiment the step S104 of determining comprises an optional step S104b of adding a frequency-domain representation W of a correction signal to the frequency-domain representation of the signal to be spectrum-shaped. The computer program 10 and/or computer program product 9 may thus comprise means for adding a frequency-domain representation W of a correction signal to the frequency-domain representation of the signal to be spectrum-shaped. The altering of the constellation points in the proper subset is thereby caused by (the addition of) the correction signal. In general terms, the correction signal should fulfil requirements corresponding to the desired properties of the signal to be spectrum-shaped. That is, the correction signal should alter the proper subset of the constellation points of the signal to be spectrum-shaped whilst maintaining the minimum distance between all of the constellation points.

There may be different ways to determine the correction signal. According to embodiments the correction signal may be based on a current symbol of the signal to be spectrum-shaped and at least one previous symbol $\ddot{X}$ of the signal to be spectrum-shaped.

Further, the correction signal may be determined using a time-domain continuity criterion. According to one embodiment the time-domain continuity criterion only is a zero:th order time-domain continuity criterion. That is, a continuity criterion requiring only that all symbols of the spectrum-shaped signal have continuous symbol block boundaries. However, also higher order continuity criterions may be applied. For example, continuity criterions as herein defined may require a deviation from continuity of the signal itself at block boundaries (0:th order) and the deviation from continuity of all derivatives of the signal at block boundaries (derivatives with respect to time) up to an arbitrary order N to be kept below a predetermined limit (i.e., not requiring absolute continuity).

An additional or alternative criterion used for determining the spectrum-shaped signal Y could be to consider the power of the correction signal. As is concluded from the above, the correction signal may be regarded as a means for moving constellation points in the proper subset "outwards" from the center of the constellation points. In general terms, the distance moved is dependent on the correction signal. In order to minimize the added power of the constellation points, as implied by movement of constellation points in the proper subset, the power of the correction signal may therefore be controlled. According to one embodiment the processing unit 3 is therefore arranged to, in an optional step S104d, minimize power of the correction signal. The computer program 10 and/or computer program product 9 may thus comprise means for minimizing power of the correction signal.

In general terms, the overall power of the signal constellation may be controlled during the determination of the spectrum-shaped signal y. Particularly, according to one embodiment the processing unit 3 is arranged to, in an optional step S104e, control an average power increase of the signal constellation. The computer program 10 and/or computer program product 9 may thus comprise means for controlling an average power increase of the signal constellation. The processing unit 3 is thereby arranged to control a peak-to-average power ratio, PAPR, of the signal constellation.

Aspects of the above disclosed embodiments for determining W will now be disclosed. Firstly, from a mathematical point of view, controlling an average power increase of the signal constellation when a correction signal is used during the spectrum shaping may be formulated as a second-order cone problem (SOCP) as follows:

$$\min_{W,p} p$$

subject to $$\|W\| \leq p$$

$$\|BW + b\| \leq \mu$$

$$\Re(W_{R+}) \succeq 0$$

$$\Im(W_{I+}) \succeq 0$$

$$\Re(W_{R-}) \preceq 0$$

$$\Im(W_{I-}) \preceq 0$$

where $\succeq$ and $\preceq$ denote element-wise inequality. The variables of the thus formulated minimization problem are the constellation-domain correction vector W and the scalar $p \in \mathbb{R}$, which has the purpose of minimizing the power of the correction signal through the first inequality. The second inequality is a relaxed version of the N-continuity criterion (smooth signal transition at block boundaries; see the above disclosed time-domain continuity criterion), which yields good out-of-band suppression while keeping the power of the correction vector at an acceptable level. The remaining four inequalities enforce the active-constellation-extension criterion (where peripheral constellation points of the set of constellation points are shifted such that the minimum distance of the constellation is maintained, see above). $\Re$ and $\Im$ denote real and imaginary part, respectively. $W_{R+}$ denotes a vector with all the elements in the set R+. The sets R+, I+, R−, and I− denote the subcarrier indices of subcarrier whose constellation points can be moved "to the right" (correction signal with positive real part), "upwards" (correction signal with positive imaginary part), "to the left" (correction signal with negative real part), and "downwards" (correction signal with negative imaginary part), respectively.

Note that a subcarrier index with a point on the constellation corner will appear in two sets (for example, a subcarrier to be modulated with a "top-left" constellation point will appear in R− and I+). $B \in \mathbb{C}^{(N+1) \times T'}$ and $b \in \mathbb{C}^{N+1}$ are given by $B = A\Phi$ and $b = A(\Phi X - \ddot{X})$, respectively $\ddot{X}$ denotes at least one previous OFDM symbol. The element in row number $i \in \{1, 2, \ldots, N+1\}$ and column number $j \in \{1, 2, \ldots, T'\}$ of $A \in \mathbb{Z}^{(N+1) \times T'}$ is given by $A_{ij} = (T_j)^{i-1}$. The elements $\Phi_{ii}$ of the diagonal matrix $\Phi \in \mathbb{C}^{T' \times T'}$ are given by $\Phi_{ii} = e^{-\sqrt{-1} 2\pi L T_i'/T'}$.

According to one embodiment the correction signal is determined using an interior point method. Hereinafter, the following notation is used for converting between complex and real numbers. A vector $\chi \in \mathbb{C}^n$ in expanded real form is denoted $x \in \mathbb{R}^{2n}$ and given by $$x = [\Re(\mathcal{X}_1) \Im(\mathcal{X}_1) \Re(\mathcal{X}_2) \Im(\mathcal{X}_2) \ldots \Re(\mathcal{X}_n) \Im(\mathcal{X}_n)]$$

A matrix $X \in \mathbb{C}^{n \times m}$ in expanded real form is denoted $X \in \mathbb{R}^{2n \times 2n}$ and obtained by replacing each element $x_{ij}$ with $$\begin{bmatrix} \Re(x_{ij}) & -\Im(x_{ij}) \\ \Im(x_{ij}) & \Re(x_{ij}) \end{bmatrix}$$

For notational purposes, it may be useful to define a set of auxiliary variables, hereinafter denoted as slacks $\delta \in \mathbb{R}^{2+R_++R_-+I_+I_-}$ given by $$\delta_1 = p^2 - \|W\|^2$$

$$\delta_2 = \mu^2 - \|BW + b\|^2$$

$$\delta_i = \Re(W_{R_++i-2}) i = \{3, 4, \ldots, 3+R_+-1\}$$

$$\delta_i = -\Re(W_{R_-i-2-R_+}) i = \{3+R_+, \ldots, 3+R_++R_--1\}$$

$$\delta_i = \Im(W_{I_+i-2-R_+-R_-})$$

$$i = \{3+R_++R_-, \ldots, 3+R_++R_-+I_+-1\}$$

$$\delta_i = -\Im(W_{I_-i-2-R_+-R_--I_+})$$

$$i = \{3+R_++R_-+I_+, \ldots, 3+R_++R_-+I_++I_--1\}$$

With slacks as defined above, a minimizer of a log-barrier function formulated as $$f(W, p) = tp - \log p - \sum_i \log \delta_i$$

is within $\mathcal{O}(1/t)$ of the globally optimal solution, where $t>0$ is often referred to as the barrier parameter.

For large t, the real-valued linear system of equations for the Newton search direction $(v, v_p)$ is $$\begin{bmatrix} \frac{\partial^2 f}{\partial W} & \frac{\partial^2 f}{\partial W \partial p} \\ \left(\frac{\partial^2 f}{\partial W \partial p}\right)^T & \frac{\partial^2 f}{\partial p^2} \end{bmatrix} \begin{bmatrix} v \\ v_p \end{bmatrix} = -t \begin{bmatrix} 0 \\ 1 \end{bmatrix}$$

where the gradient vector simplifies since tp is the dominating term in the barrier function. Setting $v_p = -1$ by implicitly choosing $$t = \frac{\partial^2 f}{\partial p^2} - \left(\frac{\partial^2 f}{\partial W \partial p}\right)^T \left(\frac{\partial^2 f}{\partial W^2}\right)^{-1} \left(\frac{\partial^2 f}{\partial W \partial p}\right)$$

yields the system of equations $Hv = -g$, where $$H = \frac{\partial^2 f}{\partial W^2} \text{ and } g = -\frac{\partial^2 f}{\partial W \partial p}.$$

Using the chain rule, the elements of the gradient vector are $$g_i = 4p \frac{x_i}{\delta_1}.$$

Evaluating the derivatives yields the Hessian matrix $$H = \frac{\partial^2 f}{\partial W^2} \left(-\sum_{i=2}^{2+R_++R_-+I_++I_-} \log \delta_i\right)$$

$$= \frac{2}{\delta_1^2}(I - WW^T) + \frac{4}{\delta_2^2}(B^T BW + b^T B)(B^T BW + b^T B)^T + \frac{2}{\delta_2} B^T B + \Delta$$

where $$\Delta_{ij} = \begin{cases} \frac{1}{\delta_{i+2}^2} & i = j \in \mathcal{R}_+ \\ -\frac{1}{\delta_{i+2+R_+}^2} & i = j \in \mathcal{R}_- \\ \frac{1}{\delta_{i+2+R_++R_-}^2} & i = j \in \mathcal{I}_+ \\ -\frac{1}{\delta_{i+2+R_++R_-+I_+}^2} & i = j \in \mathcal{I}_- \\ 0 & \text{otherwise} \end{cases}$$

FIG. 7 is a flow chart illustrating a method of determining W according to an embodiment. The method accepts the current symbol X and the previous symbol $\overline{X}$ as input and delivers a correction vector W as output. The method disclosed in FIG. 7 may be implemented by the spectral shaper 21 illustrated in FIG. 2. The spectral shaper 21 may thus be arranged to in an iterative fashion invoke the functional modules 21a-g of the spectral shaper 21.

Thus, an iterative process may be used in order to determine the correction signal. According to an embodiment the processing unit 3 is therefore arranged to, in an optional step S104c, determine the correction signal by using an iterative process. The computer program 10 and/or computer program product 9 may thus comprise means for determining the correction signal by using an iterative process.

In an initialization step S202 the initializer functional module 21a is arranged to, for each OFDM symbol, determine $B^T B$ and $b^T B$ based on X and $\overline{X}$ and set start values for p and W.

In an update slacks step S204 the slack computer functional module 21b is arranged to update the slacks $\delta_i$ based on p and W.

In a system-matrix/vector update step S208 the system setup functional module 21c is arranged to update the system matrix H and system vector g based on the slacks $\delta_i$.

In a linear system solving step S208 the linear system solver functional module 21d is arranged to solve (or approximately solve) the linear system of equations $Hv=-g$ using a standard method (such as any one of Gauss elimination, approximate Cholesky factorization, etc.).

In an update step S210 the stepper functional module 21e is arranged to update p and W by stepping in the direction indicated by the gradient as provided by the system vector g.

In an examination step S212 the flow controller 21f is arranged to examine status. For example, if $p \leq p'$ (that is, if p is below a predetermined power bound p') or k==K (that is, the maximum number of iterations K is reached), the process is terminated. Otherwise the iteration counter k is updated; k=k+1 and the process is continued at step S204. The iterative process may thus be associated with at least one stop criterion. The at least one stop criterion may thus be defined by at least one of power of the correction signal is within a pre-determined power bound or that a maximum number of iterations has been reached.

The computer program 10 and/or computer program product 9 may thus comprise means for performing steps S202-212.

Performance of the disclosed method of spectrum shaping a signal will now be discussed with reference to FIGS. 9, 10 and 11 which illustrate different types simulation results and also compare the proposed spectrum shaping to traditional pre-coding as well as a signal without having pre-coding applied.

Figure 9:
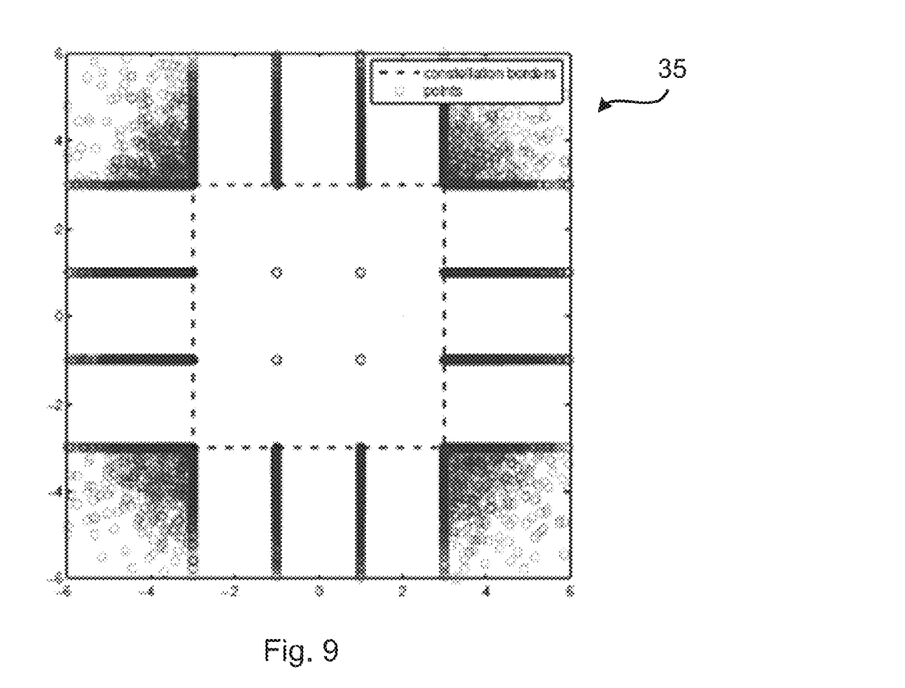
FIG. 9 illustrates constellation points in a signal constellation grid according to embodiments.

FIG. 9 illustrates simulation results of different realizations over time of applying pre-coding by means of the disclosed spectrum shaping to a signal taking values in a set of constellation points in signal constellation grid 35. The signal constellation grid 35 comprises constellation points according to a 16-QAM (Quadrature Amplitude Modulation) signal constellation. In contrast to the signal constellation grid 30 of the traditional pre-coding as illustrated in FIG. 8 the minimum distance between the constellation points in the signal constellation grid 35 of FIG. 9 has been maintained; boarders between the constellation points are clearly visible. Hence the disclosed spectrum shaping will preserve the minimum distance of a signal constellation.

Figure 10:
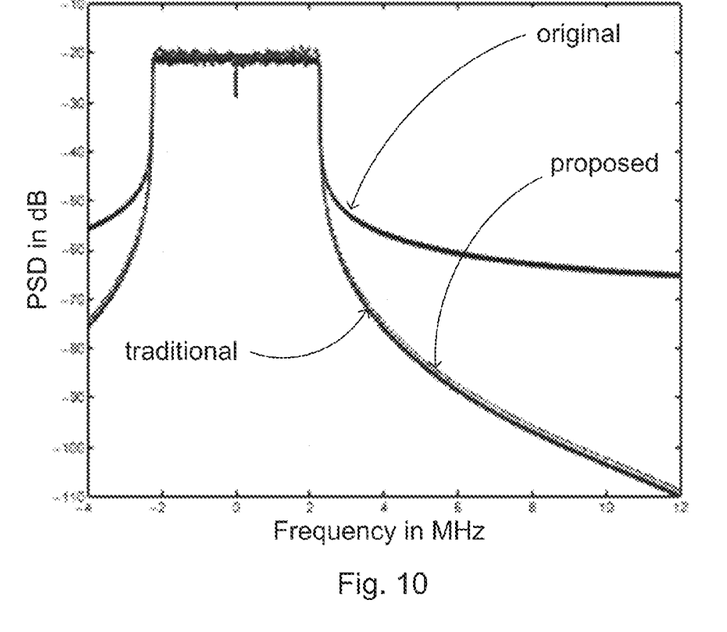
FIG. 10 illustrates power spectral density (PSD) in dB as a function of frequency (in MHz) is compared for in-band transmission of signals.

In FIG. 10 the power spectral density (PSD) in dB as a function of frequency (in MHz) is compared for in-band transmission of signals without pre-coding, (denoted "original") with traditional pre-coding, and with the proposed spectrum shaping, respectively. As can be seen in FIG. 10 the proposed spectrum shaping decays as traditional pre-coding. Hence the disclosed spectrum shaping will not only preserve the minimum distance of the signal constellation but also maintain the PSD decay.

Figure 11:
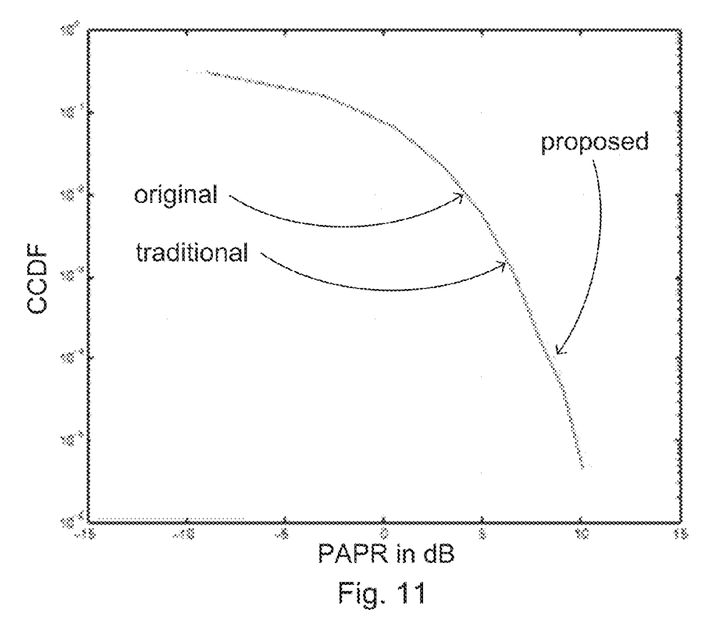
FIG. 11 illustrates the complementary cumulative distribution function (CCDF) as a function of PAPR for in-band transmission of signals.

FIG. 11 illustrates the complementary cumulative distribution function (CCDF) as a function of PAPR for in-band transmission of signals without pre-coding, (denoted "original") with traditional pre-coding, and with the proposed spectrum shaping, respectively. The CCDF As can be seen in FIG. 11 the proposed spectrum shaping decays as traditional pre-coding. Hence the disclosed spectrum shaping will not only preserve the minimum distance of the signal constellation but also maintain the PSD decay and the relation between CCDF and PAPR.

The present disclosure has mainly been described above with reference to a few embodiments. However, as is readily appreciated by a person skilled in the art, other embodiments than the ones disclosed above are equally possible within the scope of the present disclosure, as defined by the appended patent claims.

The invention claimed is:

1. A method of spectrum shaping a signal, which method comprises the steps of:
providing a frequency-domain representation X of the signal x to be spectrum-shaped, the signal being associated with a set of constellation points having a minimum distance;
determining a spectrum-shaped signal by altering a proper subset of said constellation points whilst maintaining said minimum distance between all of said constellation points, wherein said determining comprises adding a frequency-domain representation W of a correction signal to the frequency-domain representation of the signal to be spectrum-shaped; the correction signal causing said proper subset of constellation points to be altered; and
transforming the spectrum-shaped signal into a time-domain signal y.

2. The method according to claim 1, wherein said determining comprises:
adjusting coordinates of constellation points in said proper subset.

3. The method according to claim 1, wherein said proper subset of constellation points only comprises peripheral constellation points of said set of constellation points.

4. The method according to claim 1, wherein said correction signal is based on a current and at least one previous symbol of the signal to be spectrum-shaped.

5. The method according to claim 1, wherein said correction signal is determined using a time-domain continuity criterion.

6. The method according to claim 1, further comprising:
determining said correction signal by using an iterative process, the iterative process being associated with at least one stop criterion; the at least one stop criterion being defined by at least one of power of the correction signal being within a pre-determined power bound or a maximum number of iterations being reached.

7. The method according to claim 1, wherein said correction signal is determined using an interior point method.

8. The method according to claim 1, further comprising:
minimizing power of said correction signal.

9. The method according to claim 1, further comprising:
controlling an average power increase of the signal constellation, thereby controlling a peak-to-average power ratio, PARP, of the signal constellation.

10. The method according to claim 1, wherein the constellation points represent signal points of Quadrature Amplitude Modulation, QAM.

11. The method according to claim 1, wherein the signal to be spectrum-shaped represents orthogonal frequency-division multiplexing, OFDM, symbols.

12. The method according to claim 1, wherein the signal to be spectrum-shaped signal represents discrete multi-tone modulation, DMT, symbols.

13. A communications device for spectrum shaping a signal, the communications device comprising:
a communications interface arranged to provide a frequency-domain representation X of the signal x to be spectrum-shaped, the signal being associated with a set of constellation points having a minimum distance;
a processing unit arranged to determine a spectrum-shaped signal by altering a proper subset of said constellation points whilst maintaining said minimum distance between all of said constellation points, wherein the processing unit further is arranged to add a frequency-domain representation W of a correction signal to the frequency-domain representation of the signal to be spectrum-shaped; the correction signal causing said proper subset of constellation points to be altered; and
the processing unit further being arranged to transform the spectrum-shaped signal into a time-domain signal y.

14. The communications device according to claim 13, wherein
the processing unit further is arranged to adjust coordinates of constellation points in said proper subset.

15. The communications device according to claim 13, wherein
the processing unit further is arranged to determine said correction signal by using an iterative process, the iterative process being associated with at least one stop criterion; the at least one stop criterion being defined by at least one of power of the correction signal being within a pre-determined power bound or a maximum number of iterations being reached.

16. The communications device according to claim 13, wherein
 the processing unit further is arranged to minimize power of said correction signal.

17. The communications device according to claim 13, wherein
 the processing unit further is arranged to control an average power increase of the signal constellation, thereby controlling a peak-to-average power ratio, PARP, of the signal constellation.

18. A non-transitory computer-readable medium for spectrum shaping a signal, the computer-readable medium comprising computer program code which, when run on a communications device, causes the communications device to:
 provide a frequency-domain representation X of the signal x to be spectrum-shaped, the signal being associated with a set of constellation points having a minimum distance;
 determine a spectrum-shaped signal by altering a proper subset of said constellation points whilst maintaining said minimum distance between all of said constellation points, wherein said determining comprises adding a frequency-domain representation W of a correction signal to the frequency-domain representation of the signal to be spectrum-shaped; the correction signal causing said proper subset of constellation points to be altered; and
 transform the spectrum-shaped signal into a time-domain signal y.

19. A computer program product comprising a non-transitory computer-readable medium according to claim 18.

\* \* \* \* \*